United States Patent
Kasuya et al.

(12) United States Patent (10) Patent No.: US 6,686,887 B2
(45) Date of Patent: Feb. 3, 2004

(54) RADIO COMMUNICATION CARD

(75) Inventors: Takayuki Kasuya, Tokyo (JP); Yuji Shinozaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/127,428

(22) Filed: Apr. 23, 2002

(65) Prior Publication Data

US 2002/0163472 A1 Nov. 7, 2002

(30) Foreign Application Priority Data

May 1, 2001 (JP) .................................... 2001-134223
Mar. 29, 2002 (JP) .................................... 2002-094089

(51) Int. Cl.$^7$ ................................................ H01Q 1/24
(52) U.S. Cl. ............................. 343/702; 343/700 MS
(58) Field of Search ..................... 343/702, 700 MS, 343/880, 853, 893; 455/90; 361/737

(56) References Cited

U.S. PATENT DOCUMENTS 6,509,876 B1 * 1/2003 Jones et al. ................. 343/702
6,545,643 B1 * 4/2003 Sward et al. ................ 343/702

FOREIGN PATENT DOCUMENTS

| JP | U 6-13072 | 2/1994 |
| JP | A 8-277873 | 10/1996 |
| JP | A 8-279027 | 10/1996 |
| JP | A 11-135202 | 5/1999 |

* cited by examiner

*Primary Examiner*—James Clinger
(74) *Attorney, Agent, or Firm*—Oliff & Berridge, PLC

(57) ABSTRACT

The invention relates to a radio communication card and makes it possible to mount it in an existing card slot by providing an antenna portion on a surface of a card body. There is provided a radio communication card that can be mounted in a card slot of an information processing apparatus. A radio communication logic is contained in the card body and, on a surface of the card body, there is provided an antenna portion which forms at least a part of the surface of the card body. The antenna portion is configured such that it can be moved between a first position of the card body in which it is contained in the card body and a second position in which it protrudes from the card body.

10 Claims, 17 Drawing Sheets

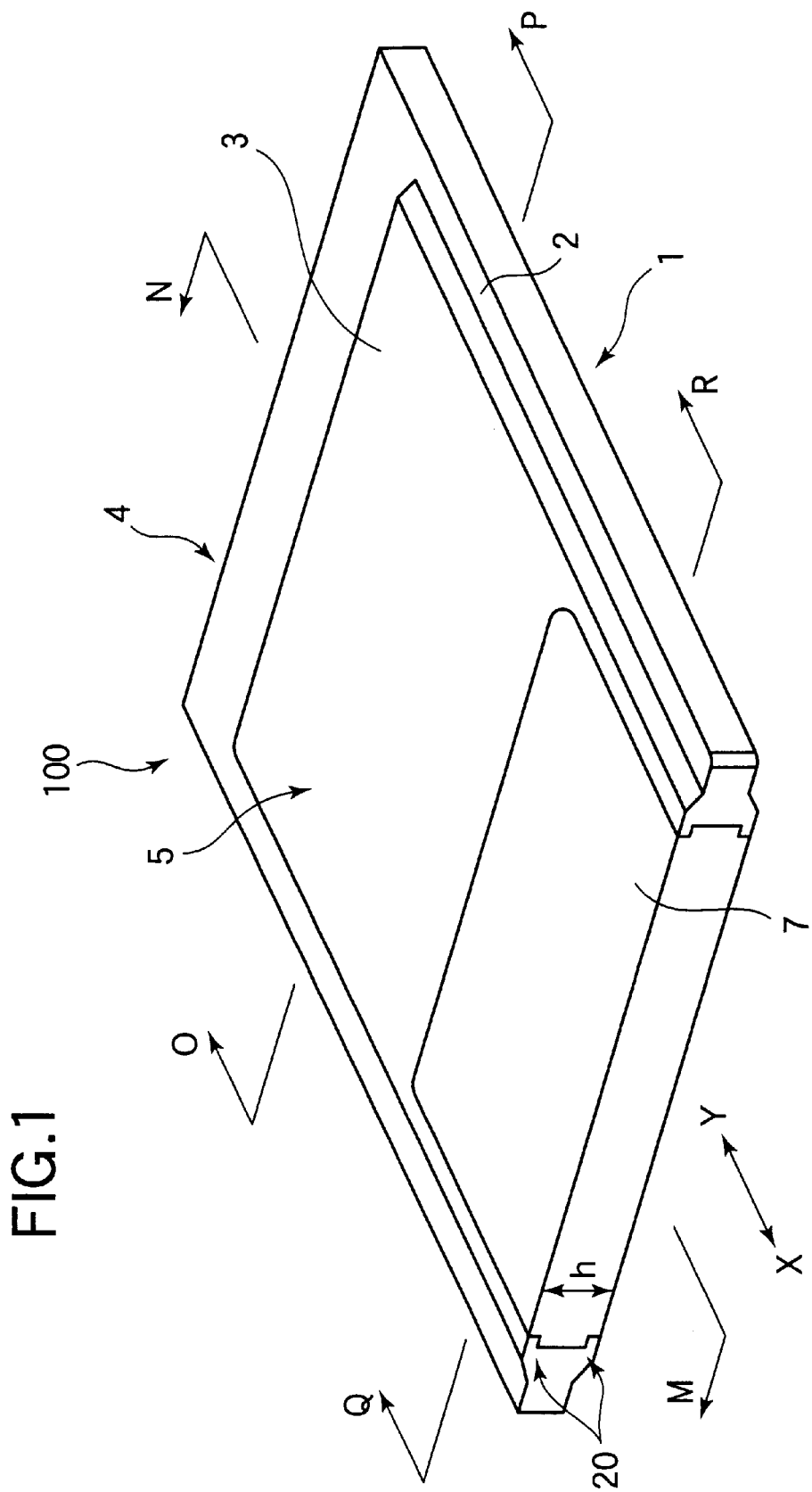

RADIO COMMUNICATION CARD

BACKGROUND OF THE INVENTION

1. Field of the Invention

The present invention relates to a radio communication card that is mounted in card slots of various information processing apparatus (such as personal computers and personal digital assistants) to allow radio communication.

2. Description of the Related Art

Radio communication cards have been known which allow radio communication to be performed using cellular phones or wireless LAN's (local area networks) without providing external modules or sections f or expansion. Such a radio communication card will now be described as an example of the related art.

The radio communication card is aimed at allowing radio communication using a cellular phone or wireless LAN without providing any external module or section f or expansion. A PC card is fabricated based on PCMCIA (Personal Computer Memory Card International Association) specifications.

FIG. 17 is an illustration of the radio communication card according to the related art. As shown in FIG. 17, a portable personal computer 51 has a liquid crystal display section 52 and a PC card slot 53. A PC card 54 for radio communication can be mounted in the PC card slot 53. An antenna containing section 55 is provided on a card body of the PC card 54. A transmission/reception antenna 56 for radio communication is rotatably attached to the antenna containing section 55. The transmission/reception antenna 56 for radio communication can be moved between a first position in which it is contained in the antenna containing section 55 and a second position in which it protrudes from the card body.

Therefore, the transmission/reception antenna 56 for radio communication can be contained in the card body by containing it in the antenna containing section 55 when radio communication is not performed. When radio communication is to be performed, the transmission/reception antenna 56 for radio communication can be pulled out from the antenna containing section 55 to be taken out from the card body. A plurality of exemplary configurations as described below is disclosed in publications of related arts.

(1) In a PC card for radio communication, an antenna containing section constituted by a groove in the form of a recess is provided on an end of the card body opposite to an end of the same where a card is inserted. A transmission/reception antenna for radio communication is contained in the antenna containing section.

(2) Another PC card for radio communication has an antenna containing section that is constituted by a hollow section extending into the card body from a surface on an end thereof opposite to an end of the same where a card is inserted.

(3) Another PC card for radio communication has an antenna containing section that is constituted by a groove in the form of a recess provided on a top surface of a card body.

(4) Another PC card for radio communication has a planar antenna section provided on a top surface of a card body.

(5) A planar antenna section is attached to an end of a card body opposite to an end thereof where a card is inserted through a hinge section. The planar antenna section can be freely rotated between a closed position in which it lies on top of the card body and an open position in which it protrudes from the card body.

(6) Another PC card for radio communication has a card body thickness that is set at the thickness of a type I or type II PC card (3.3 mm or 5 mm). The thickness of a planar antenna section is set such that the total thickness of the card body including the antenna section placed on top of the same will be equal to the thickness of a type II or type III PC card (5 mm or 10 mm).

However, the radio communication cards as examples of the related art have the following problems.

(1) When an antenna containing section constituted by a groove in the form of a recess or a hollow section is provided in a card body, the space in the card body is reduced by the presence of the antenna containing section. This sets limits on the arrangement of a substrate, components, and wiring patterns in the card body.

(2) When a planar antenna provided on a top surface of a card body is inserted in a PC card slot along with the card body, wave receiving sensitivity is reduced.

(3) In case that a type II PC card as described in the above item (6) is used, an interface connector cannot be provided in the middle of the same when a planar antenna section is placed on the card body. It is therefore difficult to realize a radio communication card having such a configuration.

SUMMARY OF THE INVENTION

One of the features of the present invention is provide a radio communication card that can be mounted in an existing card slot even when an antenna portion is provided on a surface of a card body of the same.

There is provided a radio communication card comprises: a card body which contains a radio communication logic and which can be mounted in a card slot of an information processing apparatus and an antenna portion which forms at least a part of a surface of the card body and which is mounted such that it can be moved between a first position in which it is contained in the card body and a second position in which it protrudes from the card body.

A radio communication card according to the invention may comprise the card body has a thickness substantially equal to a thickness defined in a predetermined specification when the thickness of the antenna portion is included. A radio communication card according to the invention may comprise the antenna portion has a thick portion in which an electronic component can be contained.

A radio communication card according to the invention may comprise the antenna portion has an operating portion for causing it to move between the first position and the second position. A radio communication according to the invention may comprise the card body has an elastic member for generating a force to move the antenna section from the first position to the second position.

In the above configurations, even when a radio communication card is inserted in a card slot of an information processing apparatus, the antenna portion can be used by sliding it in the card body and pulling out it from the card slot. The antenna portion can be easily moved out of the card slot, and there is no redundant step.

BRIEF DESCRIPTION OF THE DRAWINGS

FIG. 1 is an illustration of a radio communication card of a first embodiment of the invention;

DETAILED DESCRIPTION OF THE PREFERRED EMBODIMENTS

Figure 2A:
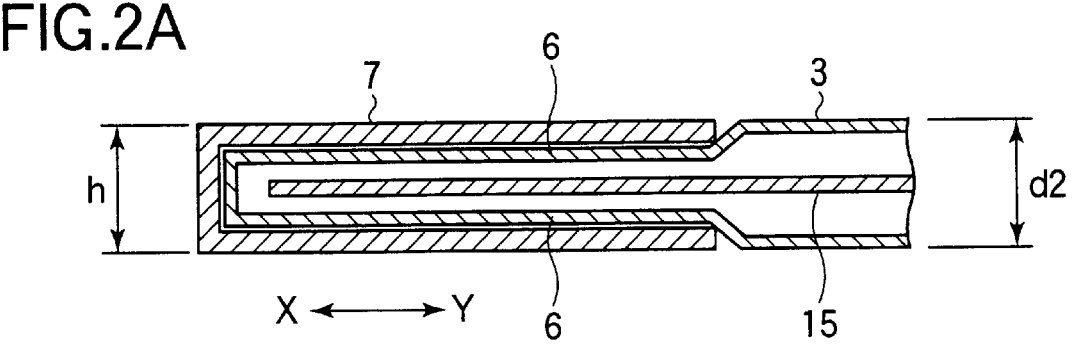
FIGS. 2A, 2B, 2C, and 2D are illustrations of the radio communication card of the first embodiment of the invention.

A radio communication card according to preferred embodiments of the invention will now be described with reference to FIGS. 1 to 16.

1. Summary of the Radio Communication Card

Radio communication cards according to the embodiments are used as cards for radio communication such as wireless LAN cards or Blue Tooth (a registered trademark of Ericsson Inc.) cards that are mounted in card slots of various information processing apparatus (personal computers and personal digital assistants, for example) to allow radio communication.

Cards for radio communication include PC cards based on the PCMCIA specifications and CF (Compact Flash; a registered trademark of Sun Disk Corp.) cards having specifications recommended by CFA (Compact Flash Association). PCMCIA is a voluntary association in the United States established in June 1989 for standardization of PC cards, and they published PC CARD STANDARD '97 in 1997. Activities of PCMCIA include efforts toward establishment of "Card Bus" which will expand the width of data buses from 16 bits to 32 bits to achieve a data transfer speed similar to that of a PCI bus and standardization of CIS (Card Information Structure) that is setting information stored in PC cards to maintain compatibility between PC cards.

Referring to physical specifications (external shape) of PC cards, they are in the form of a card of 85.6 (mm)×54 (mm) and are classified into type I, type II, and type III depending on the thickness. Any type of PC cards has a thin portion having a thickness of 3.3 mm at the periphery thereof such that it can be inserted and removed in and from a card slot of an information processing apparatus. APC card has a thick portion in the middle thereof, which has a thickness equal to or wider than the thickness (3.3 mm) of the thin portion. Referring to the thickness of the thick portions of PC cards, it is specified as 3.3 mm for the type I, 5 mm for the type II, and 10 mm for the type III.

CF cards are in the form of a card having an external dimension of 36.4 (mm)×42.8 (mm) and are classified into type I and type II depending on the thickness similarly to PC cards. The thickness of CF cards is specified as 3.3 mm for the type I and 5 mm for the type II.

Blue Tooth is one of methods for radio communication and is intended for use in relatively narrow areas. Blue Tooth is becoming the standard of specifications for high speed radio communication at a low cost. The ISMB and (Industrial Scientific and Medical Band) that is a 2.4 GHz band requiring no license is used as a carrier frequency. The maximum communication distance ranges from about 10 to 100 m.

In the embodiments, a recess is provided on a part of a surface of a PC card or CF card of the type II or type III that is used as a radio communication card, the recess having a thickness to accommodate the type I thickness, for example. An antenna portion is attached such that it can move between a first position in which it is contained in the recess of the card body and a second position in which it protrudes from the card body.

For example, when a PC card is used, the antenna portion is formed with a U-like sectional configuration such that it will be contained in a recess provided on each side of the card body. The antenna portion is provided with an antenna moving mechanism for moving the antenna portion. Thus, even when the radio communication card is mounted in a card slot (such as a PC card slot) of an information processing apparatus, the antenna portion can be used by pulling it out of the card slot. Specific examples of radio communication cards will now be described in detail.

2. Description of Radio Communication Card of First Embodiment

Figure 2B:
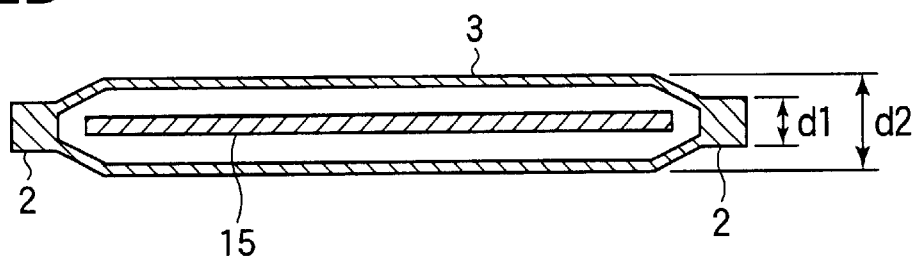
Figure 2C:
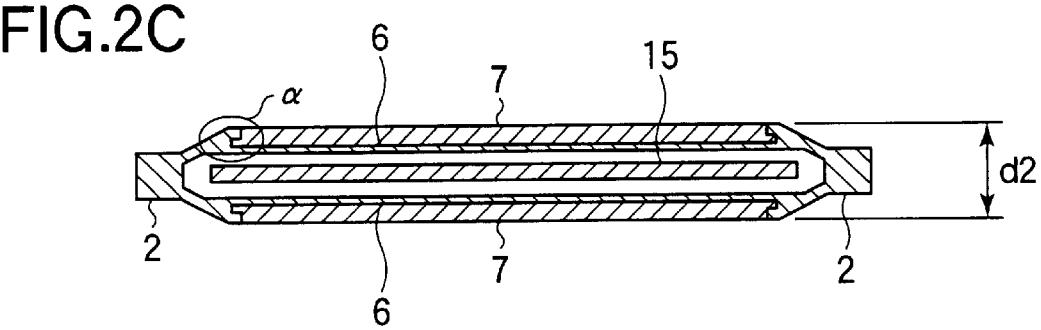
Figure 2D:
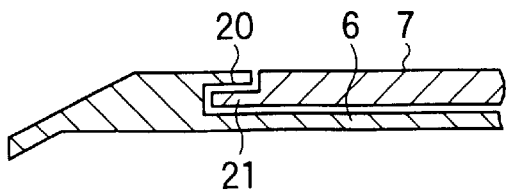

A radio communication card according to a first embodiment of the invention will be described with reference to FIGS. 1 to 6. FIG. 1 and FIGS. 2A to 2D are illustrations of the radio communication card of the first embodiment. FIG. 1 is a perspective view of the radio communication card. No illustration is presented for a moving mechanism for pulling out an antenna portion 7 when the card is mounted in a card slot of an information processing apparatus. FIG. 2A is a sectional view of the radio communication card in FIG. 1 taken along the line M–N (a sectional view along the line M–N), and FIG. 2B is a sectional view taken along the line O–P shown in FIG. 1. FIG. 2C is a sectional view taken along the line Q–R shown in FIG. 1, and FIG. 2D is an enlarged view of a part (a region a) of the sectional view along the line Q–R shown in FIG. 2C.

(1) Basic Description of Radio Communication Card

The radio communication card of the first embodiment is an example of the use of a PC card according to the PCMCIA specifications (also referred to as "PC card for radio communication"). As shown in FIG. 1 and FIGS. 2A to 2D, a PC card 1 for radio communication has a card body 100 which contains a radio communication logic and which can be mounted in a PC card slot of an information processing apparatus and an antenna portion (planar antenna) 7 provided on a surface of the card body 100. The card body 100 has a connector 4 that is electrically connected to the information processing apparatus to allow input and output of various kinds of information, a substrate 15 loaded with a plurality of electronic components including semiconductor components (see FIG. 2A), a metal panel 5 covering both of top and bottom surfaces of the substrate 15, and a recess 6 for containing the antenna portion 7.

Thin portions 2 are provided at the periphery of the PC card 1 for radio communication to allow it to be mounted in a PC card slot (not shown) of an information processing apparatus. An internal portion sandwiched by the thin portions 2 on both sides constitutes a thick portion 3. For example, the thin portions 2 have a thickness d1 of 3.3 mm, and the thick portion 3 has a thickness d2 of 5 mm. The antenna portion 7 that has a U-shaped section is provided on one side of the thick portion 3 in the longitudinal direction thereof. On the other side of the same, there is provided the connector 4 for establishing electrical connection to an internal circuit of the information processing apparatus.

The antenna portion 7 can be slid by the antenna moving mechanism in the recess 6 to be pulled out from the PC card slot with the PC card 1 for radio communication mounted in the PC card slot of the information processing apparatus. That is, the antenna portion 7 is configured such that it can be moved by the antenna moving mechanism in the directions X and Y in the figure.

By way of example, a patterned antenna having an antenna conductor formed as a planar pattern is shown as the antenna portion 7. The antenna portion 7 may be formed like a single sheet on at least either of the top and bottom surfaces of the card body 100. The antenna conductor may be formed on both of top and bottom sides of the antenna portion 7, and it may alternatively be formed only on one side of the same (on the top side, for example).

The antenna portion 7 has a height (thickness) h that is substantially equal to the thickness d2 of the thick portion 3 according to the specification for PC cards of the type II (h=d2=5 mm). Therefore, the portion can obviously be inserted in the PC card slot of the information processing apparatus and can be also contained in an existing PC card case.

When the antenna portion 7 is contained in the recess 6 of the card body 100, a recess formed by indenting a peripheral part of the recess 6 of the card body 100 in the longitudinal direction thereof is used as an anchoring portion 20, as shown in FIG. 2D. An antenna anchoring portion 21 is formed in a peripheral part of the antenna portion 7 in a position associated with the anchoring portion 20. When the antenna portion 7 is contained in the recess 6 of the card body 100, the antenna anchoring portion 21 of the antenna portion 7 is slidably engaged with the anchoring portion 20. Thus, the antenna portion 7 can be moved in the directions X and Y in FIGS. 1 and 2A by sliding it with the anchoring portion 20 and the antenna anchoring portion 21 engaged with each other.

(2) Description of Antenna Moving Mechanism

As described above, the antenna portion 7 can be moved (slid) relative to the card body 100. The PC card 1 for radio communication in the present embodiment has an antenna moving mechanism which allows the antenna portion 7 to be pulled out from and contained in the initial position (in the recess 6) with the card mounted in the card slot of the information processing apparatus.

Figure 3:
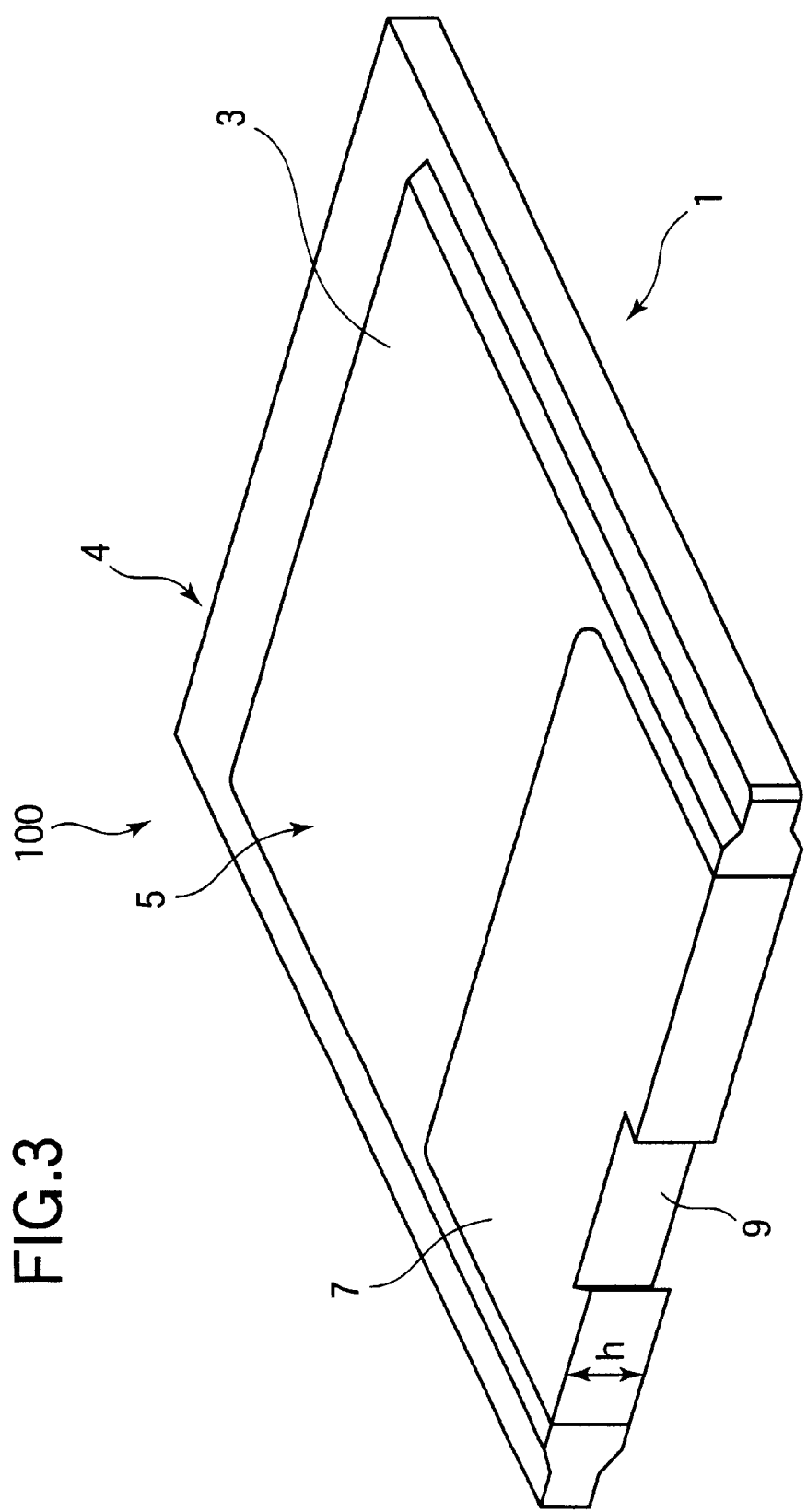
FIG. 3 is an illustration of an antenna moving mechanism of the radio communication card of the first embodiment of the invention.
Figure 4:
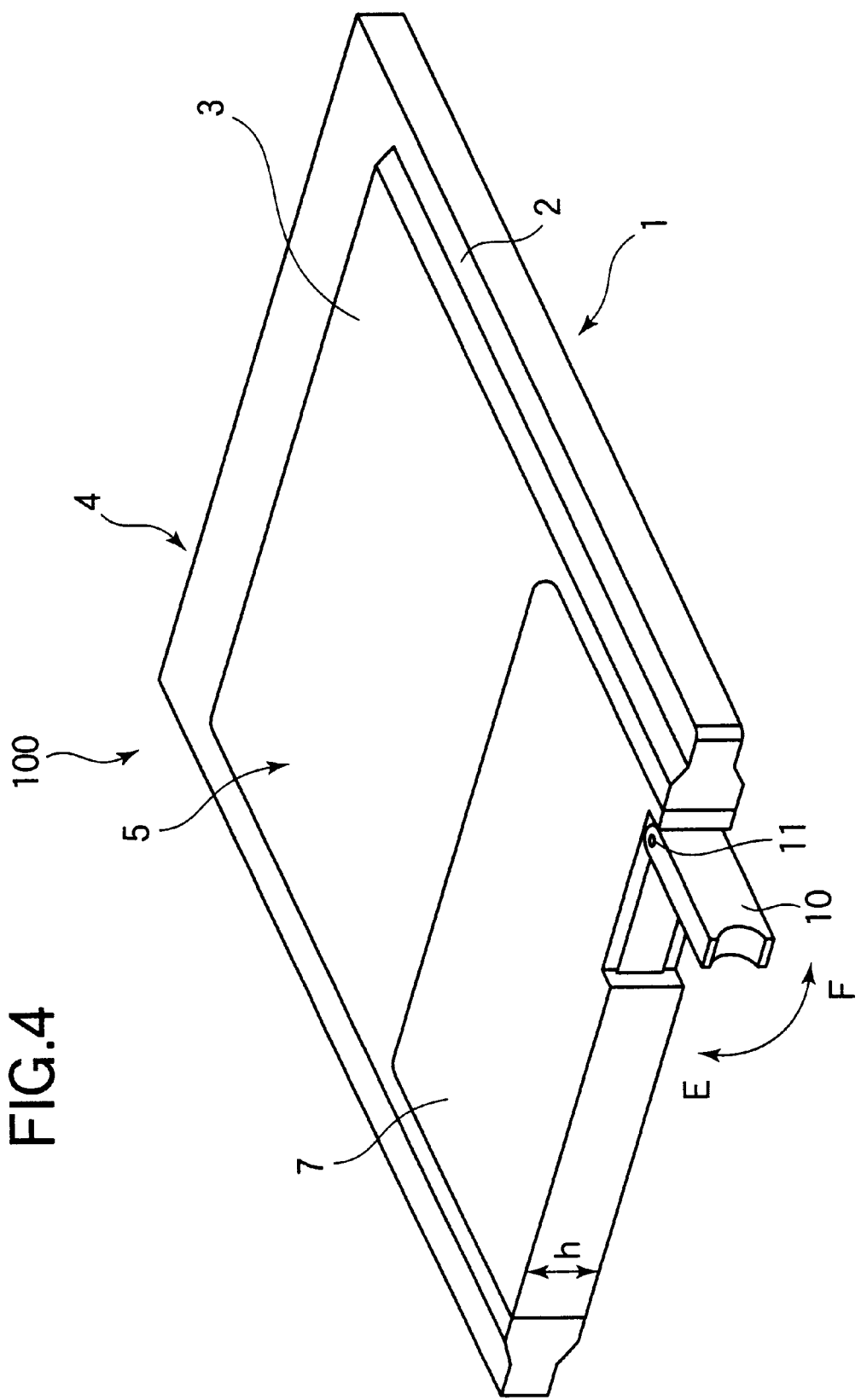
FIG. 4 is an illustration of the antenna moving mechanism of the radio communication card of the first embodiment of the invention.

Examples of the antenna moving mechanism will now be described with reference to FIGS. 3 and 4. FIGS. 3 and 4 are illustrations of antenna moving mechanisms for the radio communication card of the first embodiment. FIG. 3 shows an example of the antenna moving mechanism. As shown in FIG. 3, an antenna cutout portion 9 is provided by forming a cutout having a trapezoidal configuration on a part of a front side of the antenna 7 (a region of the same that is exposed to the outside when mounted in the card slot). This makes it possible to pull out the antenna portion 7 from the card body 100 by catching the antenna cutout portion 9 with a nail of a user or something thin like a stick (the tip of a pencil or ballpoint pen). A user can push any position of the front side of the antenna portion 7 thus pulled out toward the card body 100 to contain the antenna portion 7 in the initial position.

FIG. 4 shows another example of the antenna moving mechanism. As shown in FIG. 4, the antenna portion 7 has an antenna protrusion 10 formed by cutting and erecting a part of the antenna portion 7 and a hinge mechanism (rotating shaft member) 11. The antenna protrusion 10 is attached to the antenna portion 7 such that it can be rotated in the directions E and F in FIG. 4 about the hinge mechanism 11.

To pull out the antenna portion 7 from the card body 100, a user rotates the antenna protrusion 10 in the direction F in FIG. 4 and pulls out the antenna protrusion 10 by gripping it with fingers or the like in such a state. To return the antenna portion 7 thus pulled out to the initial position, the user pushes the antenna portion 7 toward the card body 100 to contain it in the initial state and rotates the antenna protrusion 10 in the direction E in FIG. 4 to restore the initial state.

While the antenna portion 7 can be made usable by pulling out the antenna portion 7 as thus described, the position of the antenna portion 7 is unstable when the antenna portion 7 is always free to move (free to slide). For this reason, a click stop mechanism may be provided to prevent unwanted movements of the antenna portion 7 by stopping it at the first position in which it is contained in the card body 100 and at the second position in which it protrudes from the card body 100, thereby preventing the antenna portion 7 from becoming unstable.

The click stop mechanism is a well-known mechanism. For example, a protrusion is provided on either of the top surface of the recess 6 of the card body 100 and the bottom surface of the antenna portion 7 and a recess is provided on the other such that they are engaged with each other when the antenna portion 7 is in the first and second positions. Thus, the recess and protrusion are engaged with each other to stop the antenna portion 7 in the first position when the antenna portion 7 is contained in the card body 100. In the second position in which the antenna portion 7 is pulled out from the card body 100 to protrude outward, a recess and a protrusion located in other positions are engaged with each other to stop the antenna portion 7. Such an operation is called a click stop operation.

In addition to the antenna cutout portion 9 and antenna protrusion 10 described above, there are mechanisms called an operating section including a raised portion 13 (see FIG. 9) and a slide eject button 36 (see FIG. 11) to be describe later provided for allowing the antenna portion 7 to move smoothly.

(3) Description of Electrical Connection between Antenna Portion and Substrate

Figure 5:
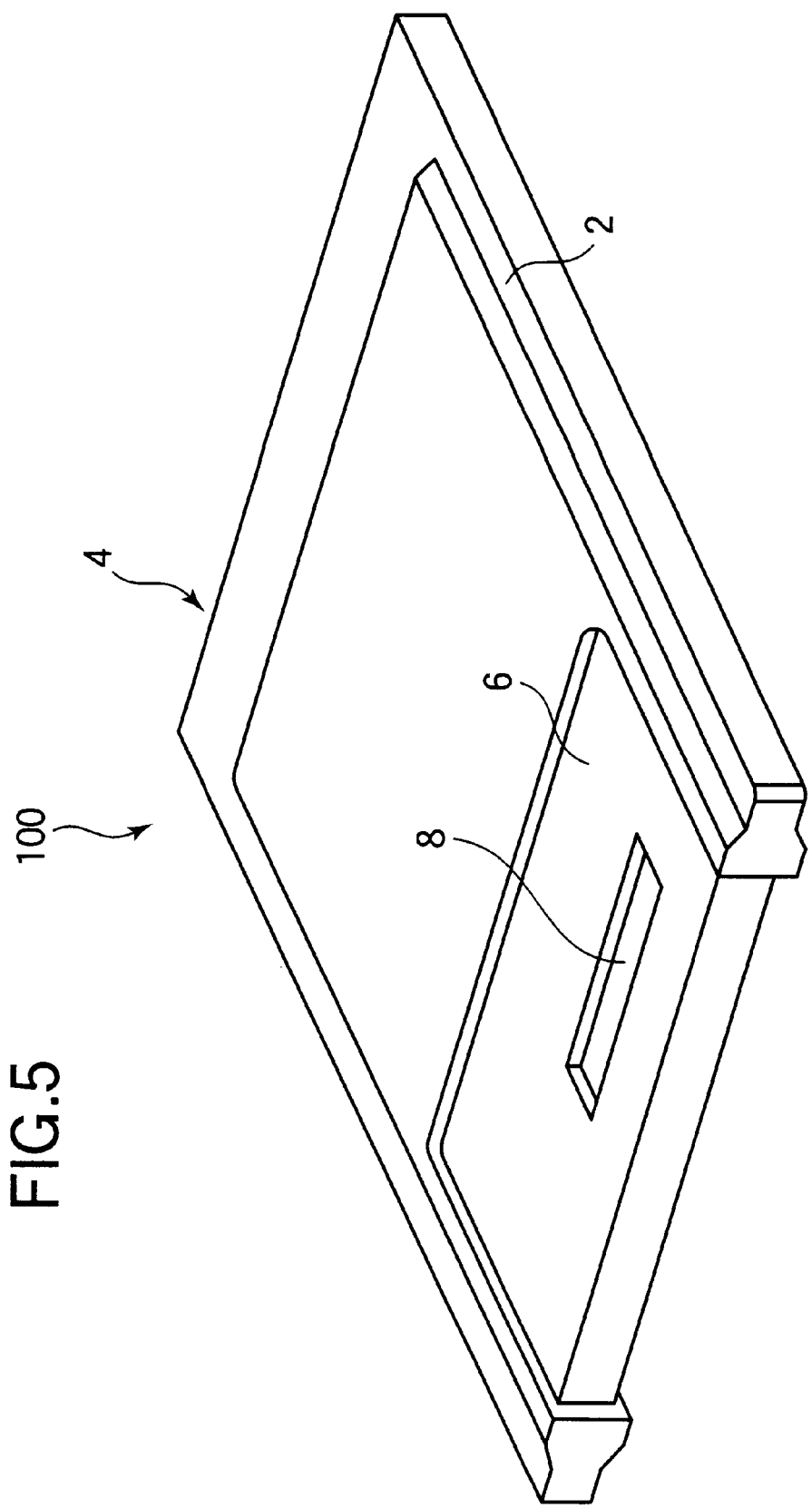
FIG. 5 is an illustration of electrical connection of the radio communication card of the first embodiment of the invention.
Figure 6:
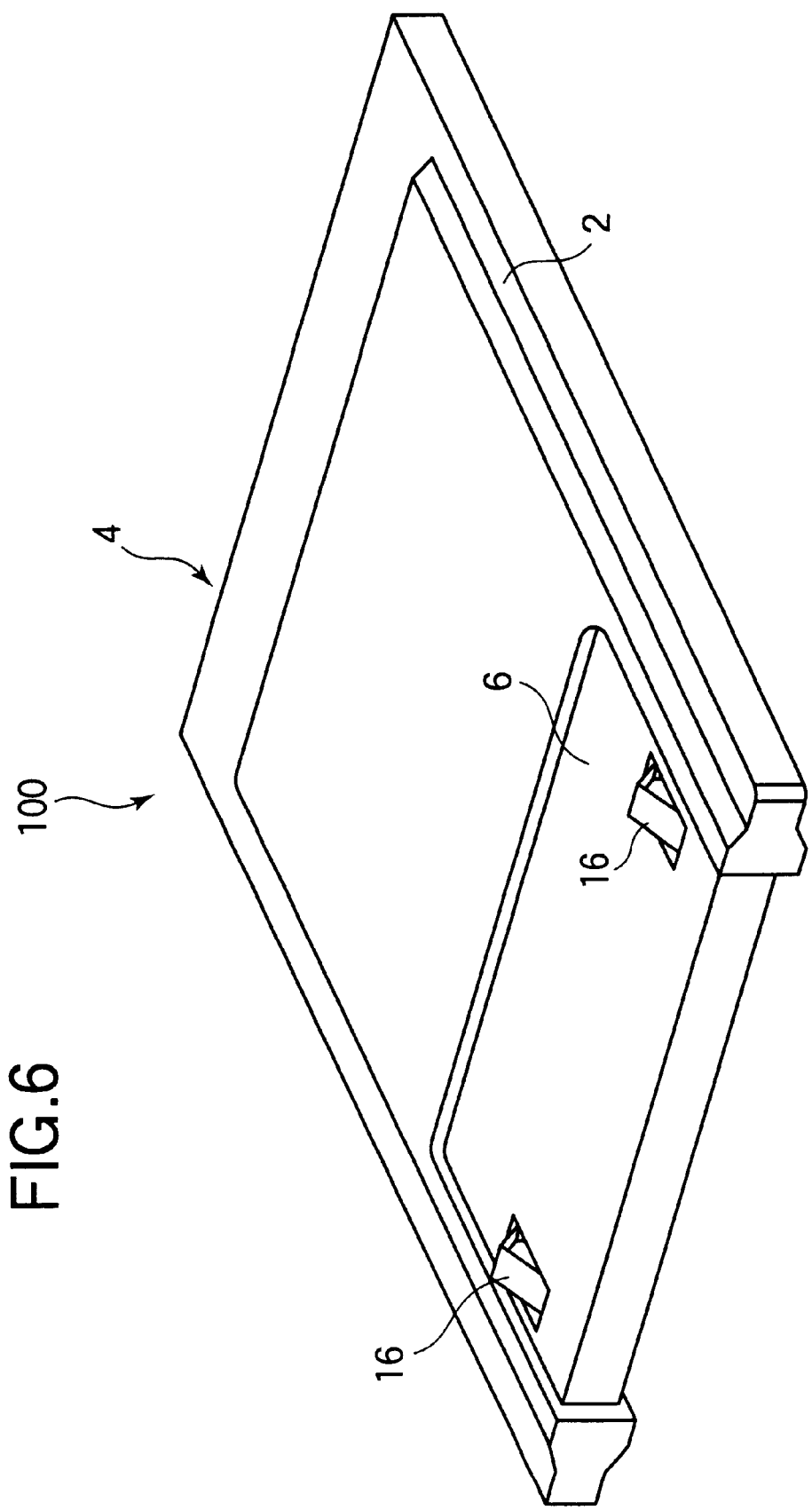
FIG. 6 is an illustration of electrical connection of the radio communication card of the first embodiment of the invention.

FIGS. 5 and 6 are illustrations of electrical connection of the radio communication card of the first embodiment. FIG. 5 shows an example of a configuration for establishing electrical connection between the antenna portion 7 and the substrate 15. As shown in FIG. 5, in order to electrically connect the antenna portion 7 and the substrate 15 of the PC card 1 for radio communication, a window 8 is provided in the recess 6 of the card body 100 by cutting out a part of the recess 6. The antenna portion 7 and the substrate 15 are connected through the window 8 using a cable or the like (a flexible printed circuit board (FPC), for example) which is relatively flexible and which is long enough to allow the antenna portion 7 to move.

FIG. 6 shows another example of a configuration for establishing electrical connection between the antenna portion 7 and the substrate 15. As shown in FIG. 6, contacts 16 constituted by conductors having elasticity (or springiness) are provided in peripheral parts of the recess 6. The contacts 16 are electrically connected to the substrate 15 and are provided such that they protrude from the surface of the recess 6. The tips of the contacts 16 are pressed against the antenna conductor provided on the bottom surface of the antenna portion 7. The contacts 16 electrically connect the antenna portion 7 and the substrate 15 of the PC card 1 for radio communication.

The antenna conductor contacting the contacts 16 is provided on the bottom surface of the antenna portion 7 with such a length that it can be always in contact within the moving range of the antenna portion 7. The contact between the contacts 16 and the antenna conductor always maintains electrical connection between the antenna portion 7 and the substrate 15 even when the antenna portion 7 is moved.

Although two contacts 16 are provided in the example shown in FIG. 6, it is required only to provide at least one contact 16 because what is required is to connect the antenna conductor on the bottom surface of the antenna portion 7 to the substrate 15. Obviously, the contacts 16 may be provided on the recess 6 on the bottom side.

Further, the recess forming the click stop mechanism may be provided on the bottom surface of the antenna portion 7, and the contacts 16 may be provided in positions in which they are engaged with the recess. As a result, the antenna portion 7 can be moved while being pressed against the contacts 16 and can be engaged with the same, which provides the click stop operation. A protrusion may be provided in place of the recess on the bottom surface of the antenna portion 7 and may be engaged with the valley between the contacts 16 to cause the click stop operation. Further, the click stop mechanism makes it possible to prevent the antenna portion 7 from coming off the card body 100.

A planar electrode or planar coil may be provided on the bottom surface of the antenna portion 7, and electrical connection may be established between the antenna portion 7 and the substrate of the PC card 1 for radio communication by a counter planar electrode or counter planar coil provided in the recess 6 shown in FIG. 6.

Obviously, the electrical connection between the antenna portion 7 and the substrate 15 may be established by using each of the above examples alone or by using two or more of the examples in combination.

3. Description of Radio Communication Card of Second Embodiment.

Figure 7:
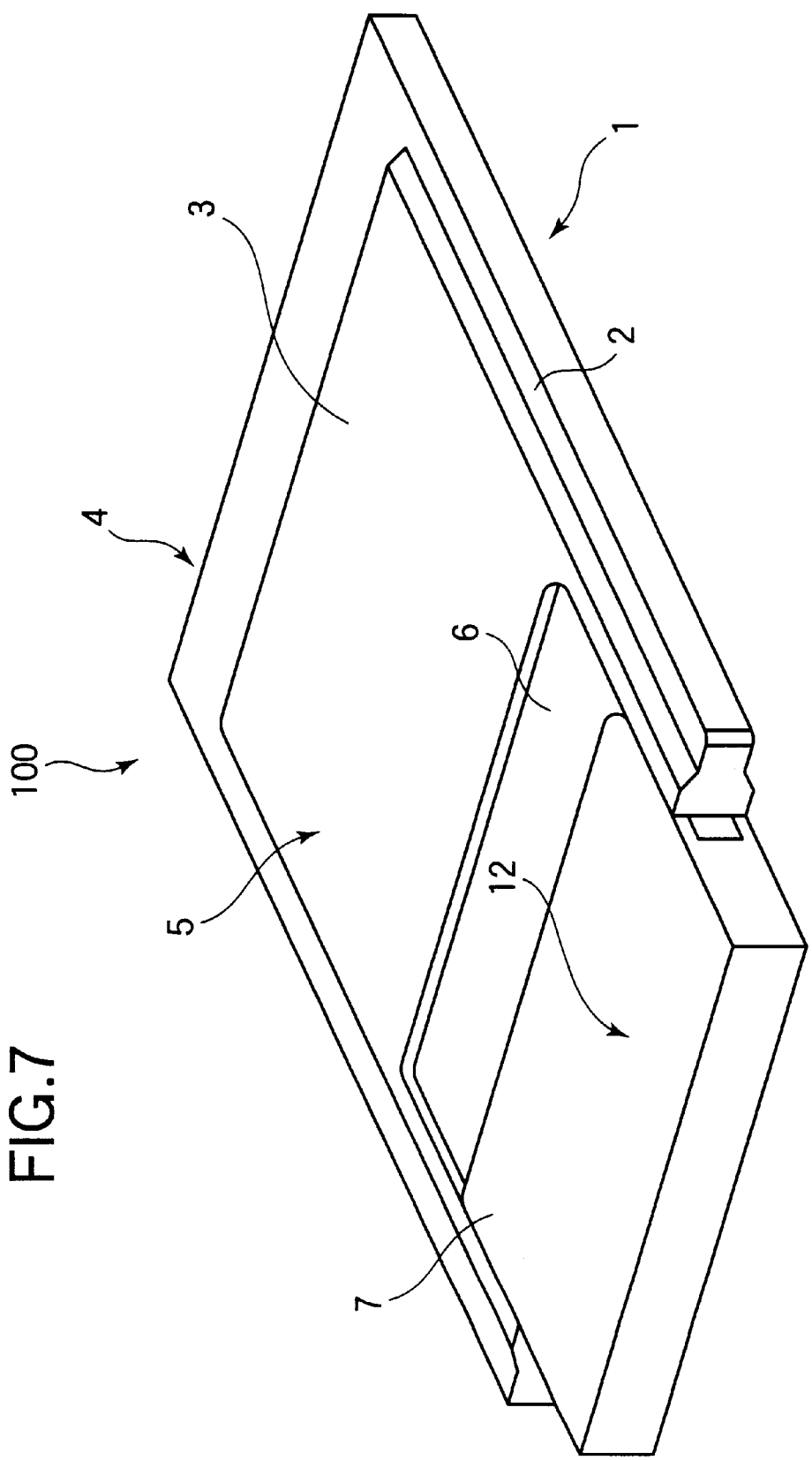
FIG. 7 is an illustration of a radio communication card of a second embodiment of the invention.
Figure 8A:
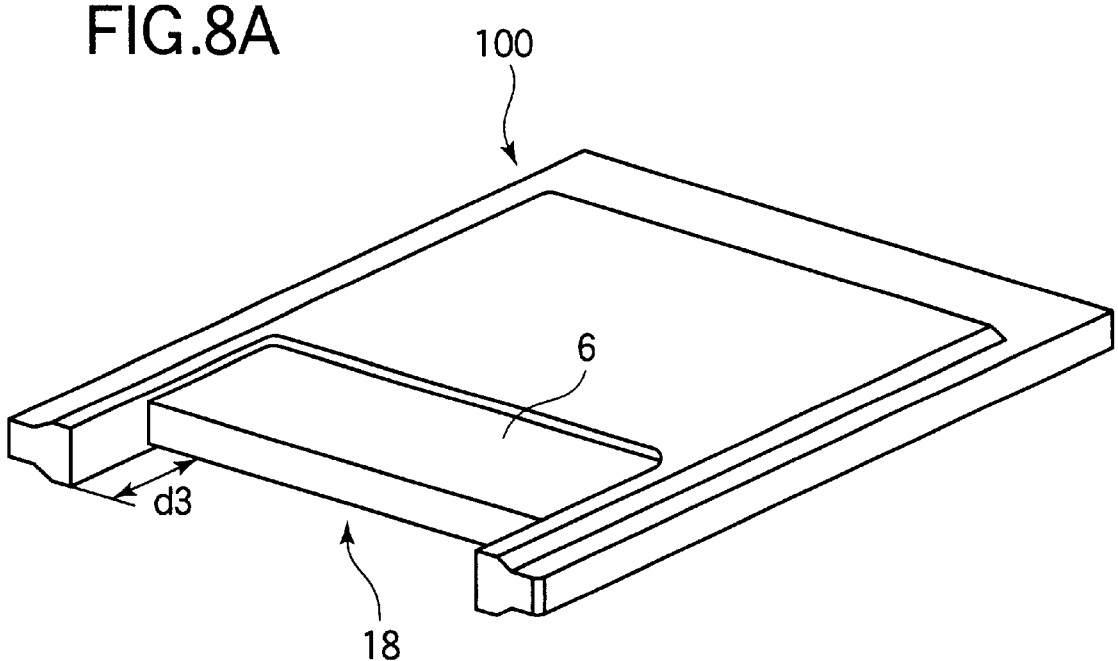
FIGS. 8A and 8B are illustrations of the radio communication card of the second embodiment of the invention.
Figure 8B:
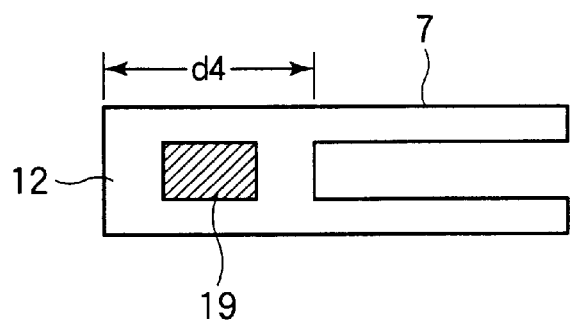

A radio communication card according to a second embodiment of the invention will now be described with reference to FIGS. 7, 8A, and 8B. FIGS. 7, 8A, and 8B are illustrations of the radio communication card of the second embodiment. FIG. 8A is a perspective view of a card body 100, and FIG. 8B is a sectional view of an antenna portion. While a planar patterned antenna that can be formed with a relatively small thickness has been described as the antenna portion 7 in the first embodiment, a chip antenna may be used to improve the sensitivity of the antenna portion 7. A PC card 1 for radio communication of the second embodiment is an example in which a chip antenna is used in a part of the antenna portion 7.

As shown in FIGS. 7 and 8B, the antenna portion 7 has a chip antenna containing section 12 that is a thick portion of the antenna portion 7. A chip antenna 19 is contained in the chip antenna containing section 12.

As shown in FIG. 8A, the card body 100 is formed with a cutout portion 18 that is a cutout in a part of a recess 6. The chip antenna containing section 12 can be contained in the cutout portion 18. Specifically, a depth d3 of the cutout portion 18 and a length d4 of the chip antenna containing section 12 are made substantially equal to each other (d3–d4). This makes it possible to contain the chip antenna containing section 12 in the cutout portion 18. Radio communication can be performed with sensitivity higher than that in the first embodiment because the chip antenna 19 is provided in the antenna portion 7.

When electronic components such as a filter are to be located as far from the card body 100 as possible in consideration to noise or wave characteristics, the electronic components such as a filter can be contained in the thick portion.

The antenna moving mechanism (the antenna cutout portion 9, the antenna protrusion 10, and so on shown in FIG. 3) and the height h of the antenna portion 7 described in the first embodiment equally apply to the second embodiment.

4. Description of Radio Communication Card of Third Embodiment

Figure 9:
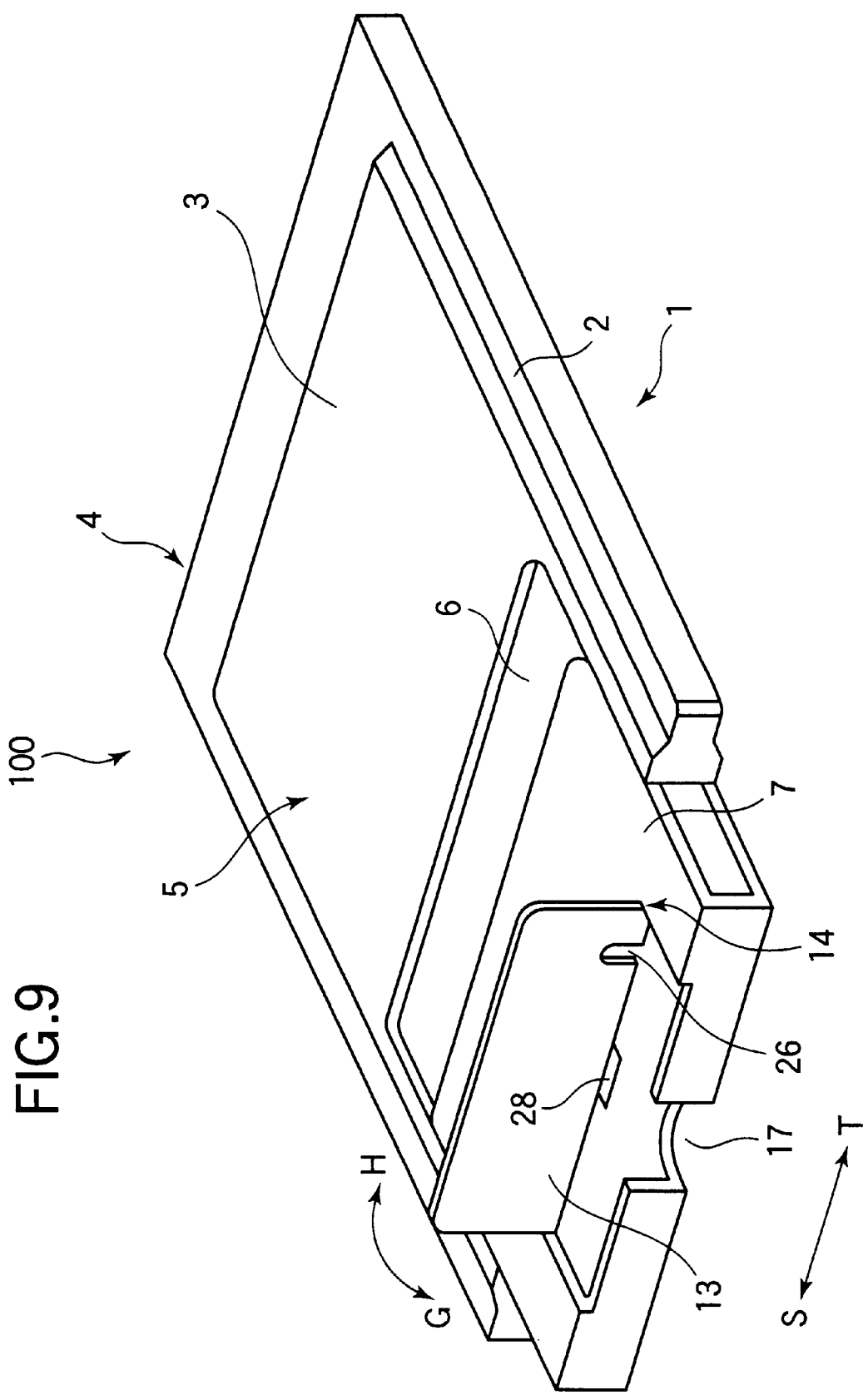
FIG. 9 is an illustration of a radio communication card of a third embodiment of the invention.
Figure 10:
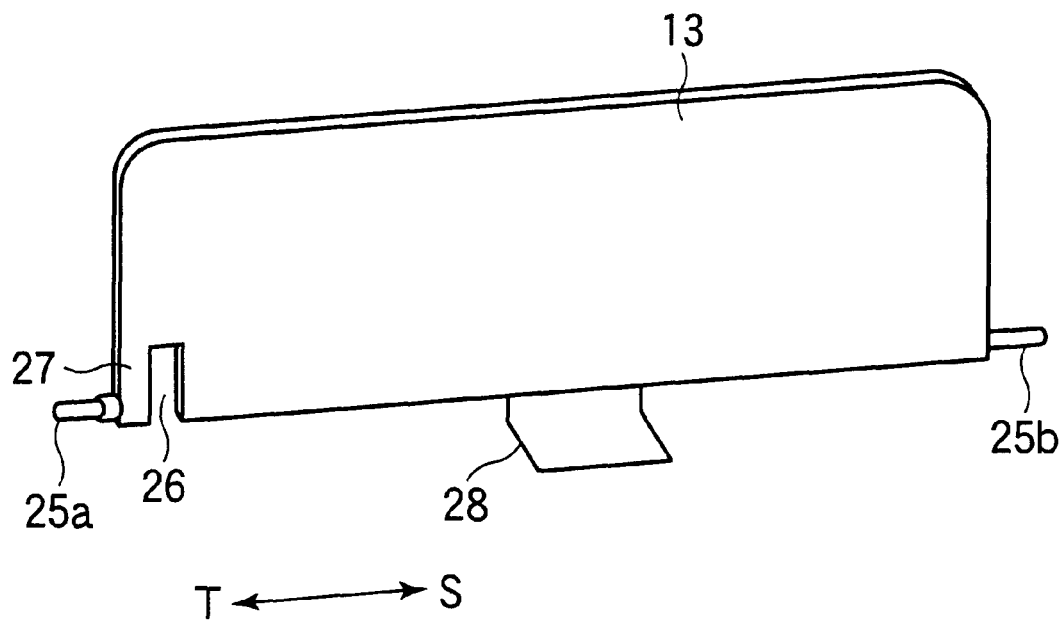
FIG. 10 is an illustration of a raised portion of the radio communication card of the third embodiment of the invention.

A radio communication card according to a third embodiment of the invention will now be described with reference to FIGS. 9 and 10. FIG. 9 is an illustration of a radio communication card of the third embodiment. FIG. 10 is an illustration of a raised portion 13 of the radio communication card of the third embodiment. In the third embodiment, the sensitivity of the antenna of a PC card 1 for radio communication according to the first embodiment can be adjusted.

In the present embodiment, a part of an antenna portion 7 is cut and raised in a rectangular configuration to provide a raised portion 13 that is configured such that it can be rotated in the directions G and H in FIG. 9 about a hinge mechanism (rotating shaft member) 14. An antenna conductor is contained in the raised portion 13. The sensitivity of the antenna can be adjusted by rotating the raised portion 13.

In this case, the antenna conductor is provided on the raised portion 13, and the antenna conductor may or may not be provided in the rest of the antenna portion 7. Connection between the antenna pattern provided in the raised portion 13 and a substrate 15 is established by a configuration similar to the configuration shown in FIG. 5 or 6.

A cutout 17 is provided on the front side of the antenna portion 7. The raised portion 13 can be rotated in the directions G and H in FIG. 7 by inserting a finger of a user (or the tip of a ballpoint pen) in the cutout 17 to lift the raised portion 13 upward. The sensitivity of the antenna can be easily adjusted by changing the angle of the raised portion 13.

While the sensitivity of the antenna is adjusted by rotating the raised portion 13 in the directions G and H in FIG. 9, stable antenna sensitivity cannot be achieved when the raised portion 13 moves away a position that has been reached through adjustment. It is therefore necessary to prevent unwanted movements of the raised portion 13.

For this purpose, as shown in FIG. 10, rotating shafts 25a and 25b are provided as a hinge mechanism 14 on one side of the raised portion 13 (the side close to the card body 100). The ends of both of the rotating shafts 25a and 25b are rotatably attached to the antenna portion 7. A slit 26 is provided at one end of the raised portion 13 (the end where the rotating shaft 25a is located). A narrow portion 27 is formed by the slit 26.

In this case, the narrow portion 27 exhibits elasticity in the directions T and S in FIGS. 9 and 10 due to the presence of the slit 26 when the raised portion 13 is fabricated from a resin having a certain degree of elasticity. The raised portion 13 is formed with a width slightly greater than the width of the opening of the antenna portion 7. The raised portion 13 is attached to the antenna portion 7 such that the narrow portion 27 is compressed in the direction S in FIG. 10.

Thus, the raised portion 13 is subjected to an urging force in the directions S and T in FIGS. 9 and 10 due to the elasticity of the narrow portion 27. This results in an increase in a frictional force between the raised portion 13 and the antenna portion 7, and the raised portion 13 is thus held in a stable state in an arbitrary position.

An FPC 28 is attached to the raised portion 13, the FPC 28 being connected to electronic components such as the antenna conductor and a filter contained in the raised portion 13 at one end thereof. Another end of the FPC 28 is connected to a substrate 15 in the card body 100.

5. Description of Radio Communication Card of Fourth Embodiment

Figure 11:
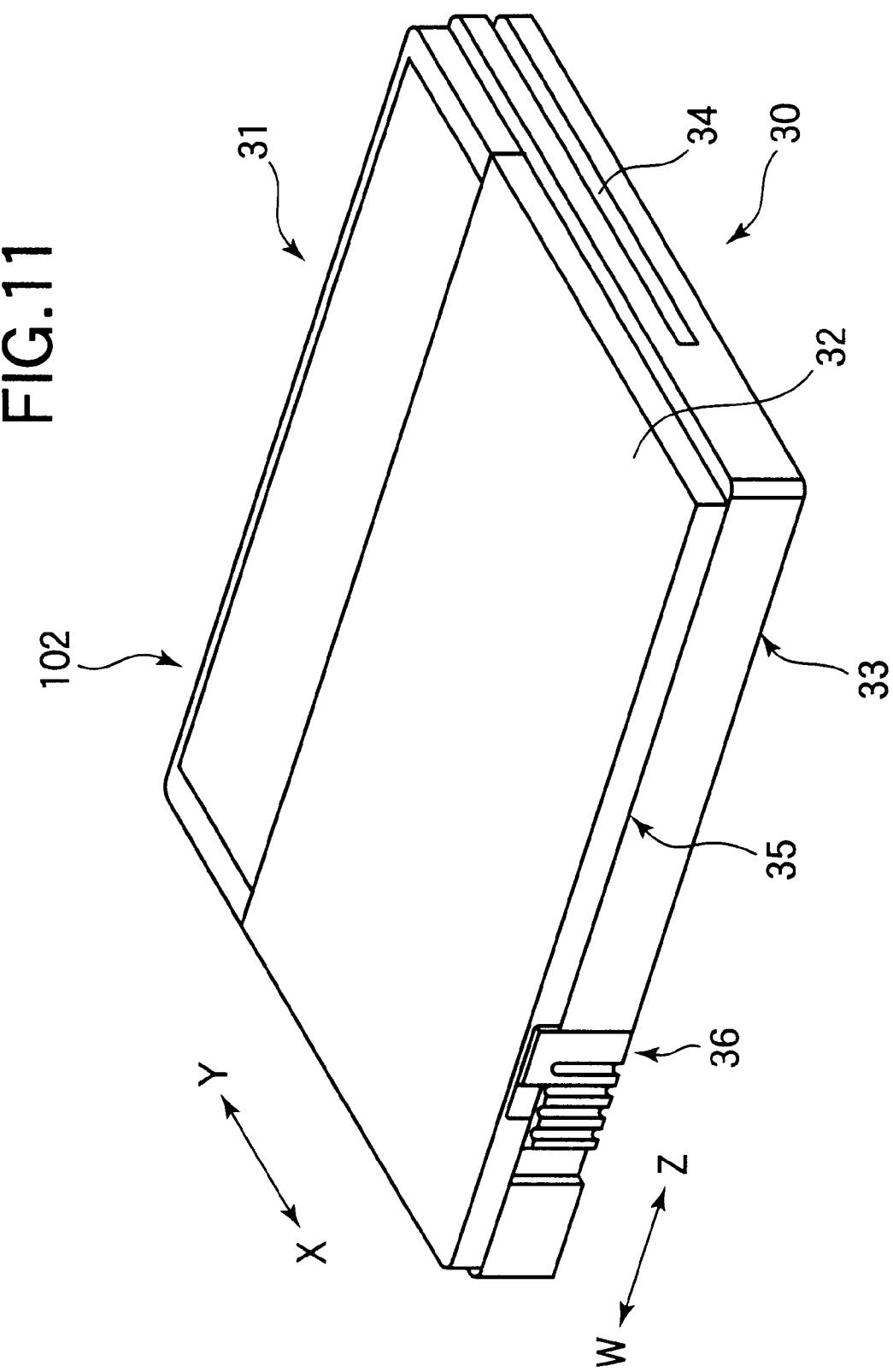
FIG. 11 is an illustration of a radio communication card of a fourth embodiment of the invention.

A radio communication card according to a fourth embodiment of the invention will now be described with reference to FIGS. 11 to 16. The fourth embodiment is an example in which a CF card (hereinafter also referred to as "CF card for radio communication") is used. FIG. 11 is an illustration of the radio communication card of the fourth embodiment. As shown in FIG. 11, a CF card 30 for radio communication has a substrate (not shown) loaded with semiconductor components and a connector 31, a frame 34 holding the substrate, a metal panel 33 covering a bottom surface of the substrate, an antenna portion 32, a recess 35 for containing the antenna portion 32, and a slide eject button 36. The thickness of the card in the position of the recess 35 is substantially equal to the thickness of a CF card of the type I (3.3 mm), for example.

Figure 12:
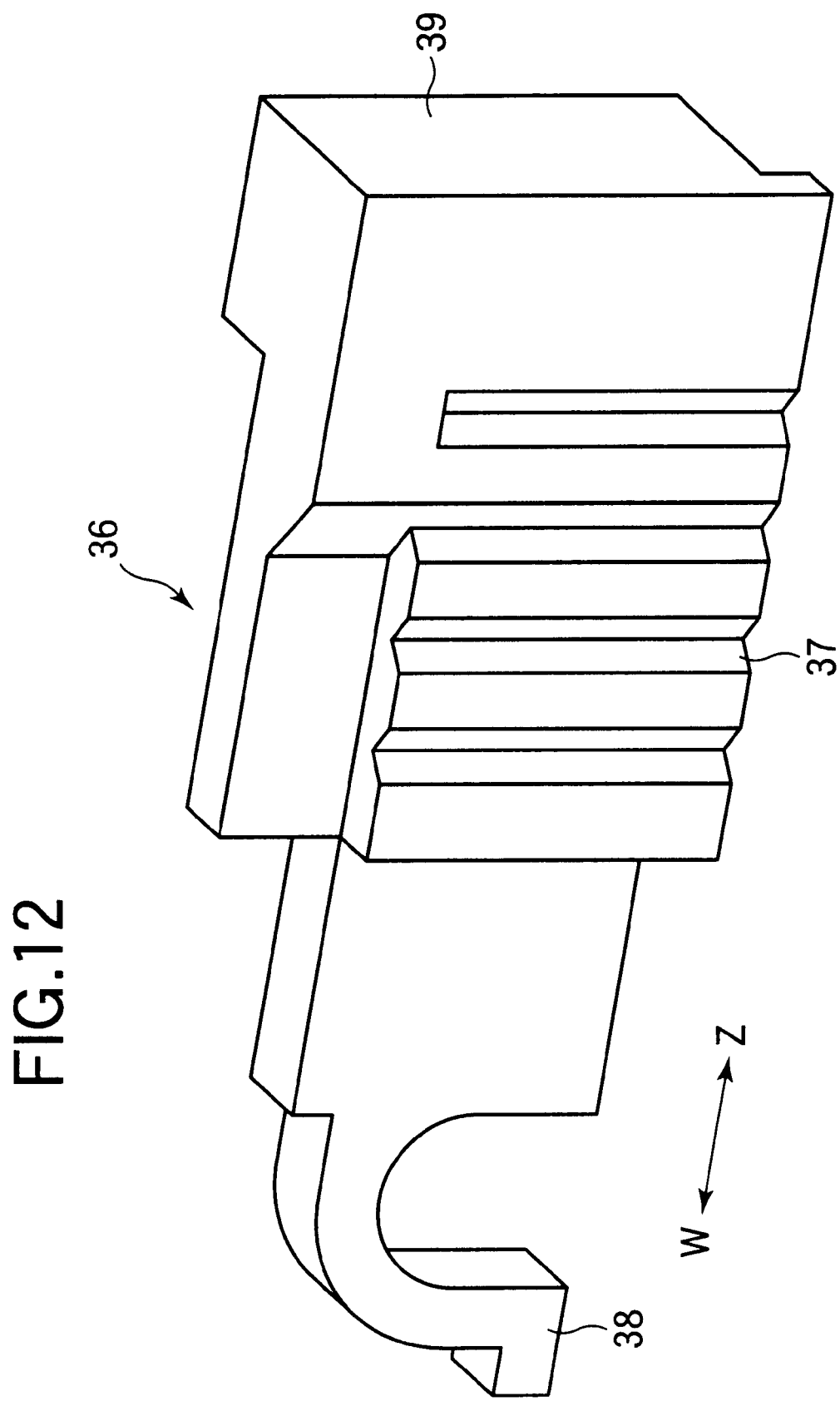
FIG. 12 is an illustration of a slide eject button of the radio communication card of the fourth embodiment of the invention.

FIG. 12 is an illustration of the slide eject button of the radio communication card of the fourth embodiment. As shown in FIG. 12, the slide eject button 36 has an anti-slip portion 37 having an irregular surface, an elastic portion 38 constituted by an elastic body and serving as a spring, and an antenna holding portion 39 for holding the antenna portion 32.

The slide eject button 36 is used by fixing it to a card body 102 at one end of the elastic portion 38 (the left end in FIG. 12). The antenna holding portion 39 is subjected to an elastic force of the elastic portion 38 acting in the direction Z in FIG. 11 when it holds the antenna portion 32. When a user moves the anti-slip portion 37 in the direction W in FIG. 11, the antenna portion 32 that has been held by the antenna holding portion 39 is released from the same to become movable in the direction X in FIG. 11.

Figure 13:
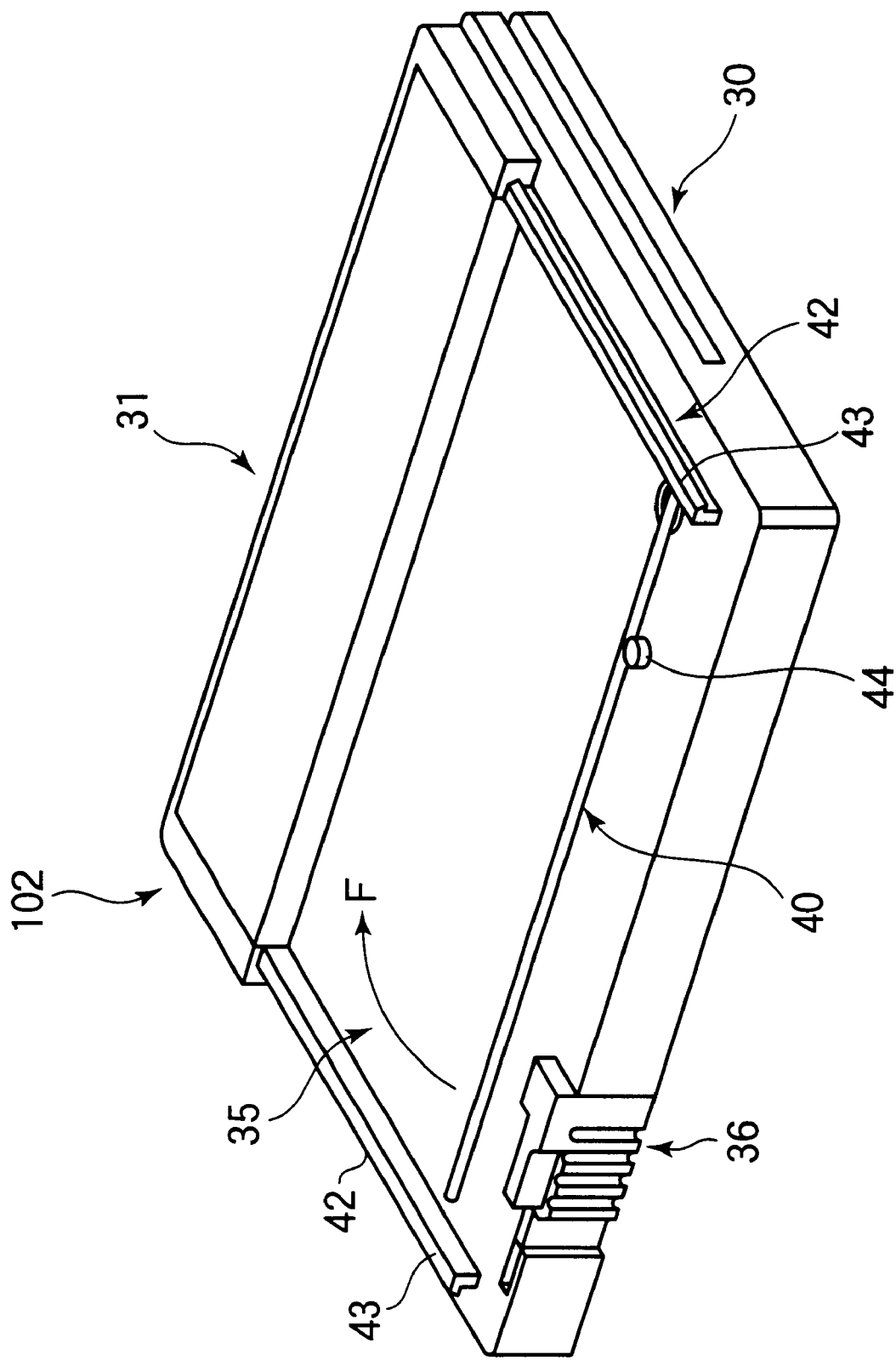
FIG. 13 is an illustration of a card body of the radio communication card of the fourth embodiment of the invention.

FIG. 13 is an illustration of the card body 102 of the radio communication card of the fourth embodiment in a state in which the antenna portion 32 is removed. As shown in FIG. 13, anchoring portions 43 for slidably attaching the antenna portion 32 are provided on both ends of the card body 102 of the CF card 30 for radio communication. The anchoring portions 43 have respective grooves 42 located outside the card body 102. Antenna anchoring portions 41 (not shown in FIG. 13) of the antenna portion 32 can be slidably anchored to the grooves 42.

As shown in FIG. 13, the card body 102 is provided with a bar-shaped spring 40 secured to one of the anchoring portions 43 at one end thereof. A stopper protrusion 44 is provided in a position where the spring 40 stops with the antenna portion 32 pulled out (see FIG. 16).

Therefore, when the antenna portion 32 protrudes from the card body 102, the spring 40 has struck the stopper protrusion 44 to be stopped. When the antenna portion 32 is contained in (kept confined to) the card body 102, a protrusion 46 (see FIGS. 14 and 15) provided on a bottom surface of the antenna portion 32 strikes the spring 40, and an open end of the spring 40 is pushed by the protrusion 46 in the direction F in FIG. 13. The antenna portion 32 is anchored by the antenna holding portion 39 of the slide eject button 36 and kept in the same state. The antenna portion 32 is moved out by moving the antenna holding portion 39 through an operation on the slide eject button 36.

Figure 14:
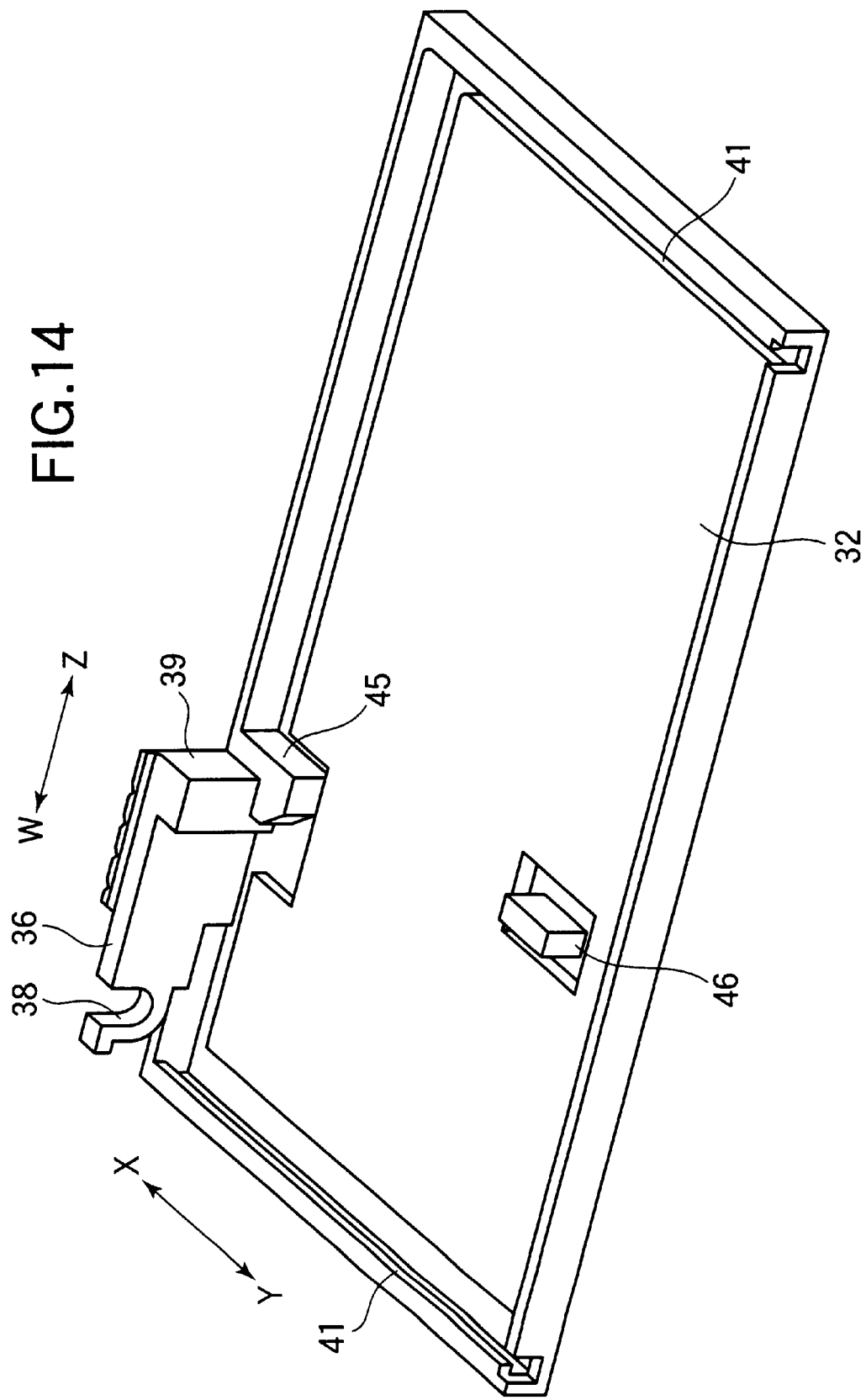
FIG. 14 illustrates an operation of the slide eject button of the radio communication card of the fourth embodiment of the invention.
Figure 15:
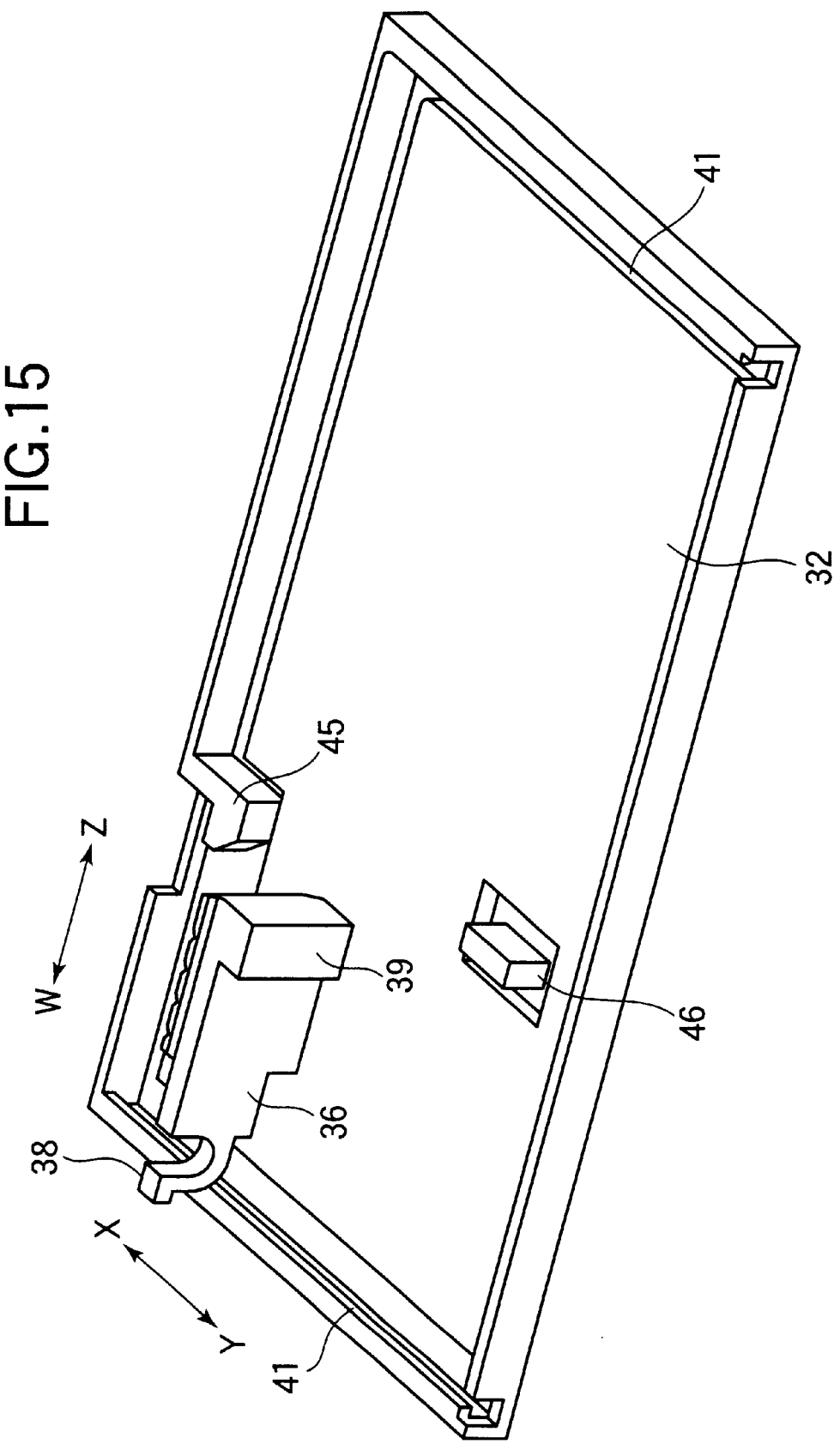
FIG. 15 illustrates an operation of the slide eject button of the radio communication card of the fourth embodiment of the invention.
Figure 16:
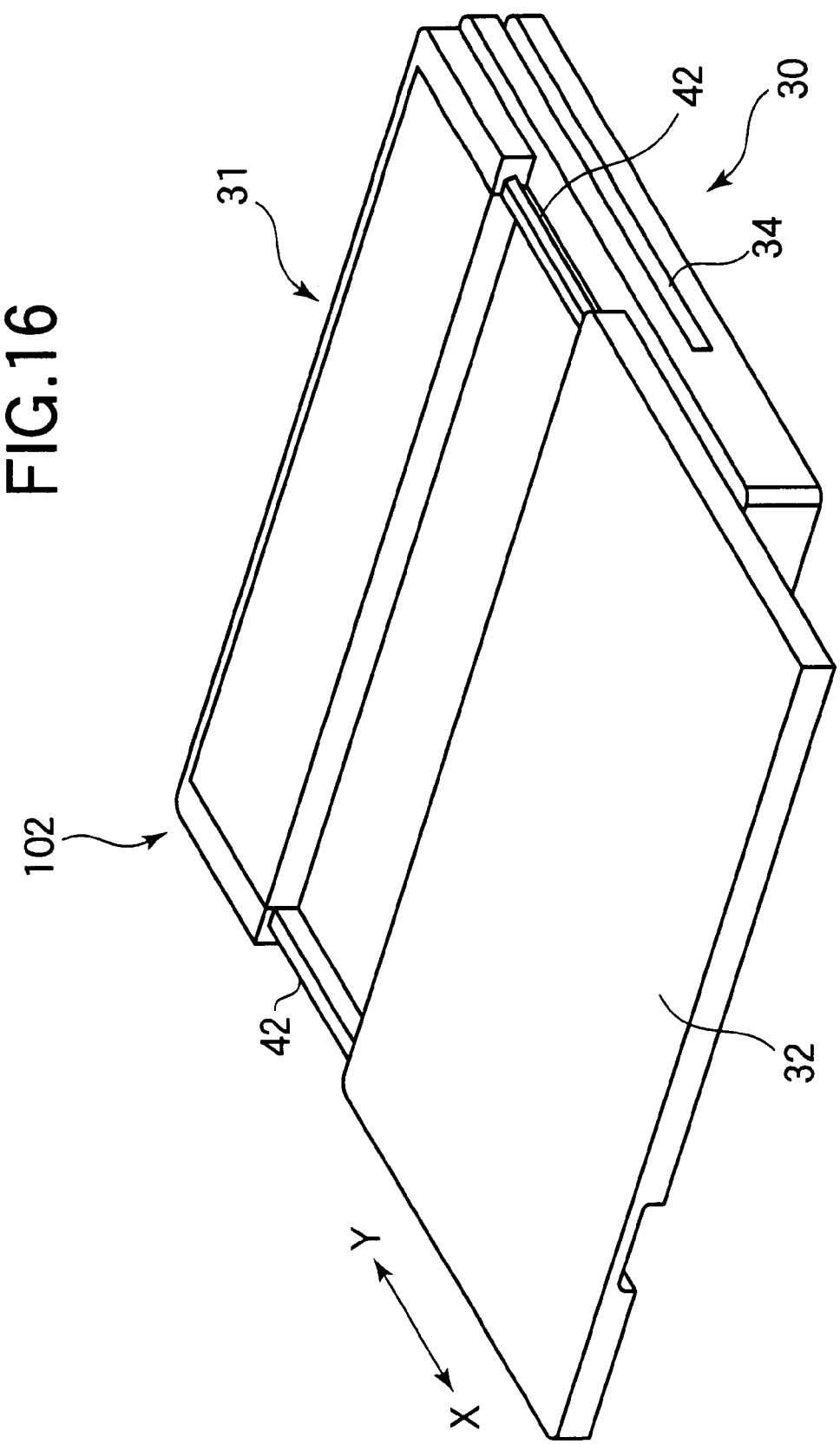
FIG. 16 is an illustration of a state of use of the radio communication card of the fourth embodiment of the invention.
Figure 17:
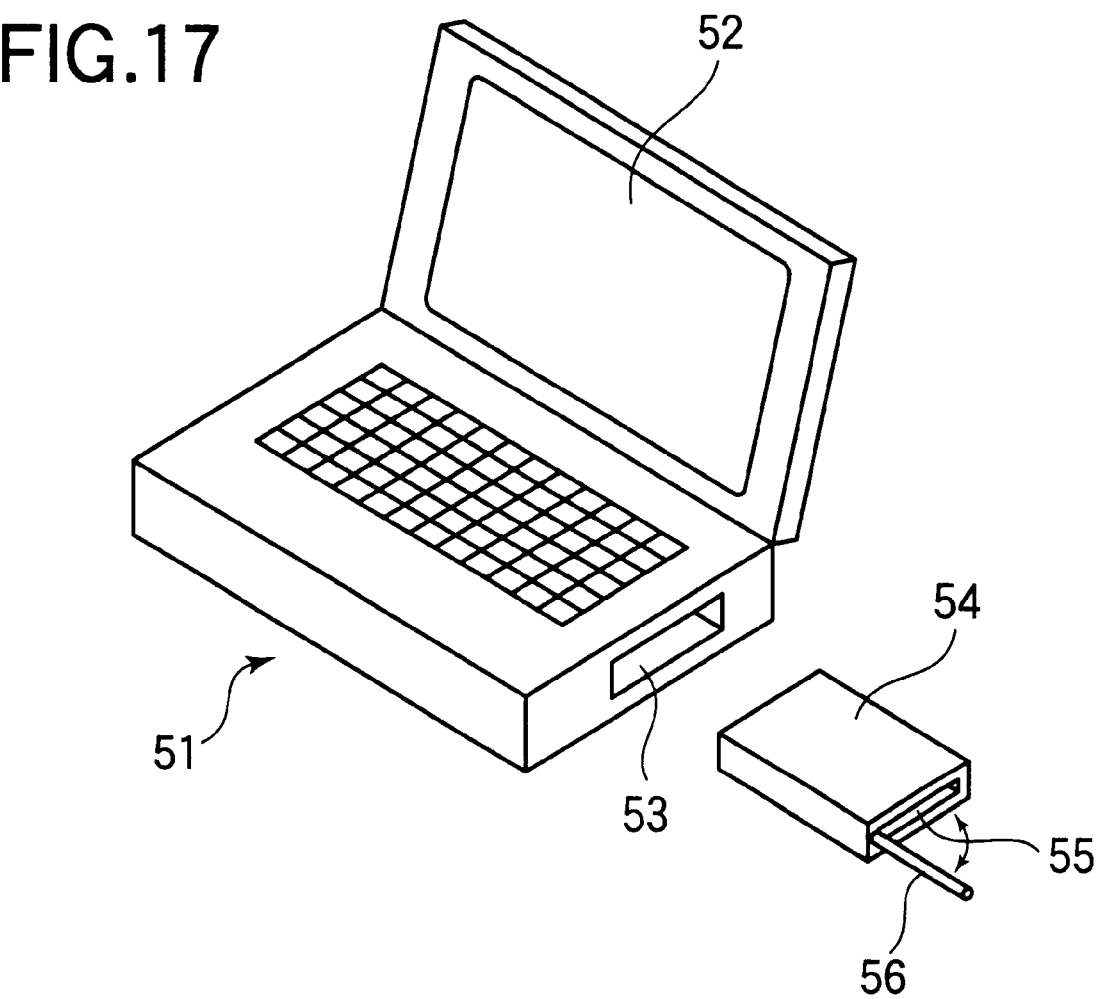
FIG. 17 is an illustration of the related art.

The moving mechanism for the antenna portion 32 will now be described in more detail with reference to FIGS. 14 to 16. FIGS. 14 and 15 illustrate the operation of the slide eject button of the radio communication card of the fourth embodiment. FIG. 16 illustrates a state of use of the radio communication card of the fourth embodiment. FIGS. 14 and 15 show a configuration of the antenna portion 32 that is constituted by a patterned antenna and the slide eject button 36 attached to the card body 102 as viewed from the backside thereof. On the backside of the slide eject button 36, the antenna holding portion 39 is provided for holding the antenna portion 32 in the position that has been reached by pushing the same into the card body 102. Although the slide eject button 36 is used in the present embodiment, a push-type eject button or the like may be used instead of the slide eject button 36.

A protrusion 45 to be engaged with the antenna holding portion 39 and a protrusion 46 to be engaged with the spring 40 are provided on the backside of the antenna portion 32. As shown in FIG. 11, when the antenna portion 32 is pushed into the card body 102 (in the direction Y in FIG. 11), the protrusion 46 is engaged with the spring 40 to rotate the open end of the spring 40 in the direction F in FIG. 13. At this time, the antenna portion 32 is subjected to a force in the direction of coming out from the card body 102 (the direction X in FIG. 14), the force originating from un urging force of the spring 40.

In the above state, however, the antenna holding portion 39 is caught by the protrusion 45. The elasticity of the elastic portion 38 of the slide eject button 36 exerts an urging force in the direction Z in FIG. 14 to the antenna holding portion 39 to urge the protrusion in the direction Z. Thus, the antenna portion 32 is kept in a predetermined containing position (home position) without moving from the card body 102 (without protruding in the direction X in FIG. 14).

When the anti-slip portion 37 of the slide eject button 36 is moved by a finger of a user or the like in the direction W in FIG. 14 in the above-described state, the antenna holding portion 39 leaves the protrusion 45 as shown in FIG. 15. As a result, the antenna portion 32 moves (protrudes) out of the card body 102 (in the direction X in FIG. 15) because of the urging force of the spring 40 to enter the state shown in FIG. 16. The state is a normal state of use of the antenna portion 32.

When the user thereafter pushes the front side of the antenna portion 32 (the side on which the slide eject button 36 is located) to move it into the card body 102 (in the direction Y in FIG. 16), the state shown in FIG. 14 returns in which the antenna holding portion 39 is caught by the protrusion 45 to hold the antenna portion 32 in the predetermined containing position.

Since the CF card 30 for radio communication is smaller than a PC card, when it is to be mounted in a PC card slot of an information processing apparatus, the CF card 30 for radio communication must be mounted in the slot after mounting it to an adaptor having the same external dimensions as those of a PC card and electrically connecting the connector 31 of the CF card 30 for radio communication to a connector of the adaptor. In the case of an information processing apparatus having a CF card slot, the CF card 30 for radio communication may be directly mounted in the CF card slot.

Obviously, the present embodiment is similar to the first embodiment with respect to electrical connection between the antenna portion 32 and a substrate (not shown) loaded with semiconductor components and the connector 31, the click stop mechanism, and the operation of preventing the antenna portion from coming off.

6. Others

The antenna moving mechanisms described in the first through fourth embodiments of the invention are not limited to the above examples and may alternatively be implemented as follows.

For example, a push—push mechanism may be used as an antenna moving mechanism. For example, the push—push mechanism has an operating portion which can be pushed by a user to cause operations, an actuator coupled with the operating portion, a spring member for urging an object to be operated in a predetermined direction, and a switching mechanism which drives the actuator in accordance with the operation of pushing the operating portion to switch an engaged state and an unengaged state of the object to be operated alternately. The push—push mechanism is capable of moving the object to be operated in a predetermined direction and returning it to the initial position (i.e., capable of causing a linear reciprocating movement).

No detailed description will be made on the push—push mechanism because it is a well-known mechanism.

In this case, the radio communication card in each of the embodiments of the invention is provided with a push—push mechanism with which a first pushing operation and a subsequent second pushing operation can be repeated to alternately perform the operation of causing the antenna portion to protrude from the card body and the operation of containing the antenna portion in the card body.

For example, an operation button that can be pushed by a user may be provided on the front side of the antenna portion, and an actuator may be driven in accordance with the pushing operation on the operation button to cause the antenna portion to protrude from the card body or to contain the same in the card body.

A configuration may be employed in which the operating portion of the push—push mechanism is coupled or interlocked with the antenna portions of the embodiments. For example, when an antenna portion is mounted in a card slot of an information processing apparatus, a part of the antenna portion exposed at the card slot may be used as an operating section. This enables an operation in which a push on the part of the antenna portion (the part serving as an operating section) causes the antenna portion to protrude from the card body and in which another push on the part of the antenna portion causes the antenna portion to be contained in the card body.

As described above, the invention has the following advantages.

(1) Since the thickness of the radio communication cards in the position of the recesses 6 and 35 is made substantially equal to a thickness specified in a specification, there is no limit on the arrangement of substrates, components, and wiring patterns in the card bodies 100 and 102. Since an interface connector can be provided in the middle of a card, the card can be used by mounting it in an existing card slot of an information processing apparatus.

(2) The antenna portion 7 has high mechanical strength because it is formed in a substantially U-like configuration, which reduces the possibility of breakage of the same.

(3) The sheet-like antenna portions 7 and 32 are provided at least in part of the top and bottom surfaces of the card bodies 100 and 102. Therefore, components having a great height can be provided in regions of the card bodies 100 and 102 where the antenna portions 7 and 32 are not provided, which eliminates any limitation on the arrangement of components. As a result, the designing of radio communication cards is simplified.

(4) The antenna portion 7 can be moved relative to the card body 100 by the antenna protrusion 10 that is configured such that it can be rotated about a rotating shaft member (the hinge mechanism 11, for example). That is, the antenna portion 7 can be pulled out by rotating the antenna protrusion 10 outward and by gripping the antenna protrusion 10 with a hand of a user. As a result, even after a radio communication card is mounted in a card slot of an information processing apparatus, the antenna portion 7 can be easily used by sliding it in the card body 100 and by pulling out it from the card slot. This eliminates awkwardness in use.

(5) A part of the antenna portion 7 is formed thick to provide a thick portion, and electronic components can be contained in the thick portion. As a result, a chip antenna having sensitivity higher than that of a patterned antenna can be contained in the thick portion. When electronic components such as a filter are to be located as far from the card body 100 as possible in consideration to noise or wave characteristics, the electronic components such as a filter may be contained in the thick portion.

(6) An antenna conductor is contained in the raised portion 13, and the sensitivity of the antenna can be adjusted by rotating the raised portion 13. This makes it possible to always perform radio communication with good reception sensitivity.

(7) The antenna portion 7 can be pushed by an elastic member to be moved from the first position in which it is contained in the card body 100 to the second position in which it protrudes from the card body 100. It is therefore possible to move the antenna portion 7 out of a card slot easily, and this eliminates redundant steps in operation.

(8) The card body 102 has the antenna holding portion 39 for holding the antenna portion 32 in a predetermined position and the slide eject button 36. Therefore, the antenna portion 32 can be moved out of a card slot only by operating the slide eject button 36, which eliminates redundant steps in operation.

(9) The use of a push—push mechanism allows the antenna portions 7 and 32 to be protruded from a card slot and to be contained in predetermined positions of the card bodies 100 and 102 by only repeating pushing operations, which eliminates redundant steps in operation.

What is claimed is:

1. A radio communication card comprising:

a card body containing a radio communication logic and being mountable in a card slot of an information processing apparatus; and an antenna section forming at least a part of a surface of the card body and mounted such that an antenna can be moved between a first position in which the antenna is contained in the card body and a second position in which the antenna protrudes from the card body, wherein the antenna section is located on the surface of the card body in the first and second positions, and is located in at least one portion of an upper side or a lower side of the card body in the first position.

2. The radio communication card according to claim 1, wherein the card body has a card thickness substantially equal to a specification thickness defined in a predetermined specification when an antenna thickness of the antenna portion is included.

3. The radio communication card according to claim 1, wherein the antenna portion has a thick portion in which an electronic component can be contained.

4. The radio communication card according to claim 1, wherein the antenna portion has an operating portion for moving between the first position and the second position.

5. The radio communication card according to claim 1, wherein the card body has an elastic member for generating a force to move the antenna portion from the first position to the second position.

6. A radio communication card comprising:

a card body containing a radio communication logic and being mountable in a card slow of an information processing apparatus; and an antenna section forming at least a part of a surface of the card body and mounted such that an antenna is moved between a first position in which the antenna is contained in the card body and a second position in which the antenna protrudes from the card body, wherein the antenna section is formed with a U-like sectional configuration so as to be contained in a recess provided on each side of the card body.

7. The radio communication card according to claim 6, wherein the card body has a card thickness substantially equal to a specification thickness defined in a predetermined specification when an antenna thickness of the antenna portion is included.

8. The radio communication card according to claim 6, wherein the antenna portion has a thick portion in which an electronic component can be contained.

9. The radio communication card according to claim 6, wherein the antenna portion has an operating portion for moving between the first position and the second position.

10. The radio communication card according to claim 6, wherein the card body has an elastic member for generating a force to move the antenna portion from the first position to the second position.

* * * * *